US007684799B2

(12) United States Patent
Kuchibhotla et al.

(10) Patent No.: US 7,684,799 B2
(45) Date of Patent: Mar. 23, 2010

(54) METHOD FOR DATA TRANSFER WITH A MOBILE STATION WHILE IN DISCONTINUOUS RECEPTION STATE

(75) Inventors: Ravi Kuchibhotla, Gurnee, IL (US); Robert T. Love, Barrington, IL (US); Kenneth A. Stewart, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 409 days.

(21) Appl. No.: 11/391,112

(22) Filed: Mar. 28, 2006

(65) Prior Publication Data

US 2007/0230400 A1 Oct. 4, 2007

(51) Int. Cl.
*H04W 36/00* (2006.01)
(52) U.S. Cl. ........................ 455/436; 455/437; 455/522; 455/574; 370/331; 370/335
(58) Field of Classification Search ......... 455/436–437, 455/572–574, 525, 522, 69; 370/311, 332, 370/335
See application file for complete search history.

(56) References Cited

U.S. PATENT DOCUMENTS

| 4,698,839 | A  |   | 10/1987 | Devaney et al.              |
|-----------|----|---|---------|-----------------------------|
| 5,128,938 | A  | * | 7/1992  | Borras ............... 370/311 |
| 5,265,119 | A  | * | 11/1993 | Gilhousen et al. ....... 370/335 |
| 5,267,262 | A  | * | 11/1993 | Wheatley, III ........... 455/522 |
| 5,392,287 | A  | * | 2/1995  | Tiedemann et al. ....... 370/311 |
| 5,539,748 | A  | * | 7/1996  | Raith ................. 370/329 |
| 5,745,860 | A  | * | 4/1998  | Kallin .................. 455/574 |
| 5,772,072 | A  |   | 6/1998  | Prescott et al.              |
| 5,797,094 | A  | * | 8/1998  | Houde et al. ............ 455/412.2 |
| 5,799,256 | A  | * | 8/1998  | Pombo et al. ............ 455/574 |
| 6,058,289 | A  | * | 5/2000  | Gardner et al. ........... 340/7.32 |
| 6,138,034 | A  | * | 10/2000 | Willey .................. 455/522 |
| 6,363,267 | B1 | * | 3/2002  | Lindskog et al. ............ 455/574 |
| 6,505,058 | B1 | * | 1/2003  | Willey .................. 455/574 |
| 6,625,467 | B2 | * | 9/2003  | New et al. .............. 455/525 |
| 6,889,067 | B2 | * | 5/2005  | Willey .................. 455/574 |
| 6,973,310 | B2 | * | 12/2005 | Neufeld ................ 455/436 |
| 7,203,506 | B2 | * | 4/2007  | Kim et al. .............. 455/466 |
| 2002/0061757 | A1 | * | 5/2002 | Hunzinger .............. 455/458 |
| 2003/0117996 | A1 | * | 6/2003 | Lim et al. .............. 370/350 |
| 2004/0043798 | A1 | * | 3/2004 | Amerga et al. ........... 455/574 |
| 2004/0100940 | A1 |   | 5/2004 | Kuure et al.              |
| 2004/0127265 | A1 | * | 7/2004 | Van Bosch et al. ......... 455/574 |
| 2005/0047357 | A1 | * | 3/2005 | Benveniste ............. 370/311 |
| 2006/0029011 | A1 | * | 2/2006 | Etemad et al. ........... 370/311 |

(Continued)

OTHER PUBLICATIONS

International Search Report and Written Opinion for International Application No. PCT/US07/64230 dated Nov. 21, 2007 (8 pages).

*Primary Examiner*—Sharad Rampuria
(74) *Attorney, Agent, or Firm*—Gary J. Cunningham

(57) ABSTRACT

A method for sleep mode during an impending handover is disclosed. The method comprises receiving (104) from a network a handover threshold value. Then once in sleep mode, monitoring (128) a channel condition of a handover candidate cell and determining that the handover threshold value of the handover candidate cell has been exceeded. After receiving a pending data indicator, remaining awake (134) to receive a data set associated with the pending data indicator. The network re-schedules (216) transmission of the data set to the mobile station.

18 Claims, 2 Drawing Sheets

U.S. PATENT DOCUMENTS

2006/0094437 A1* 5/2006 Sinnarajah et al. ....... 455/452.1
2006/0281466 A1* 12/2006 Gholmieh et al. ........... 455/450
2007/0183355 A1* 8/2007 Kuchibhotla et al. ........ 370/318
2008/0268844 A1* 10/2008 Ma et al. .................... 455/436

* cited by examiner

METHOD FOR DATA TRANSFER WITH A MOBILE STATION WHILE IN DISCONTINUOUS RECEPTION STATE

FIELD OF THE INVENTION

The present invention relates generally to sleep mode and, more particularly to mobile sleep mode and handover.

BACKGROUND OF THE INVENTION

Wireless networks such as Enhanced UMTS, 802.16e and the like are being designed to support the packet switched (PS) domain only. Traditionally the user equipment, also known as a mobile station or mobile, is either in an active state with a dedicated connection or in a paging or dormant state (i.e. sleep mode) to conserve energy. In paging state, the mobile supports discontinuous reception wherein the mobile sleeps and wakes up at pre-determined intervals to check if the network has paged it. In 3GPP (UMTS) the mobile has an additional CELL_FACH state where it continuously monitors the downlink common control channel for activity.

The paging state, i.e. the discontinuous reception state, helps to conserve battery charge by reducing the average current drain, however at the cost of some latency for downlink transmissions. The mobile can at any time send an uplink signaling message to indicate a need to transmit in the uplink. In CELL_FACH state the mobile is unable to conserve battery charge due to the continuous monitoring of the control channels.

One of the undesirable effects of the discontinuous reception state is that mobile may be better served by a neighboring cell site due to change in radio conditions however the current serving cell site has pending data to exchange with the mobile. If it is determined that the mobile has poor link performance with the current serving cell, typically the current serving cell executes the handover procedure and as part of the handover procedure forwards the data to be exchanged to the target neighboring cell, that is the candidate for handover instead of to the mobile. Then the neighboring cell, once the connection is established with the mobile, sends the data to the mobile. This creates a delay in getting the data to the mobile in addition to having to use extra resources to transfer the data from the current serving cell to the neighboring cell and then to the mobile.

The various aspects, features and advantages of the present invention will become more fully apparent to those having ordinary skill in the art upon careful consideration of the following Detailed Description of the Invention with the accompanying drawings described below.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
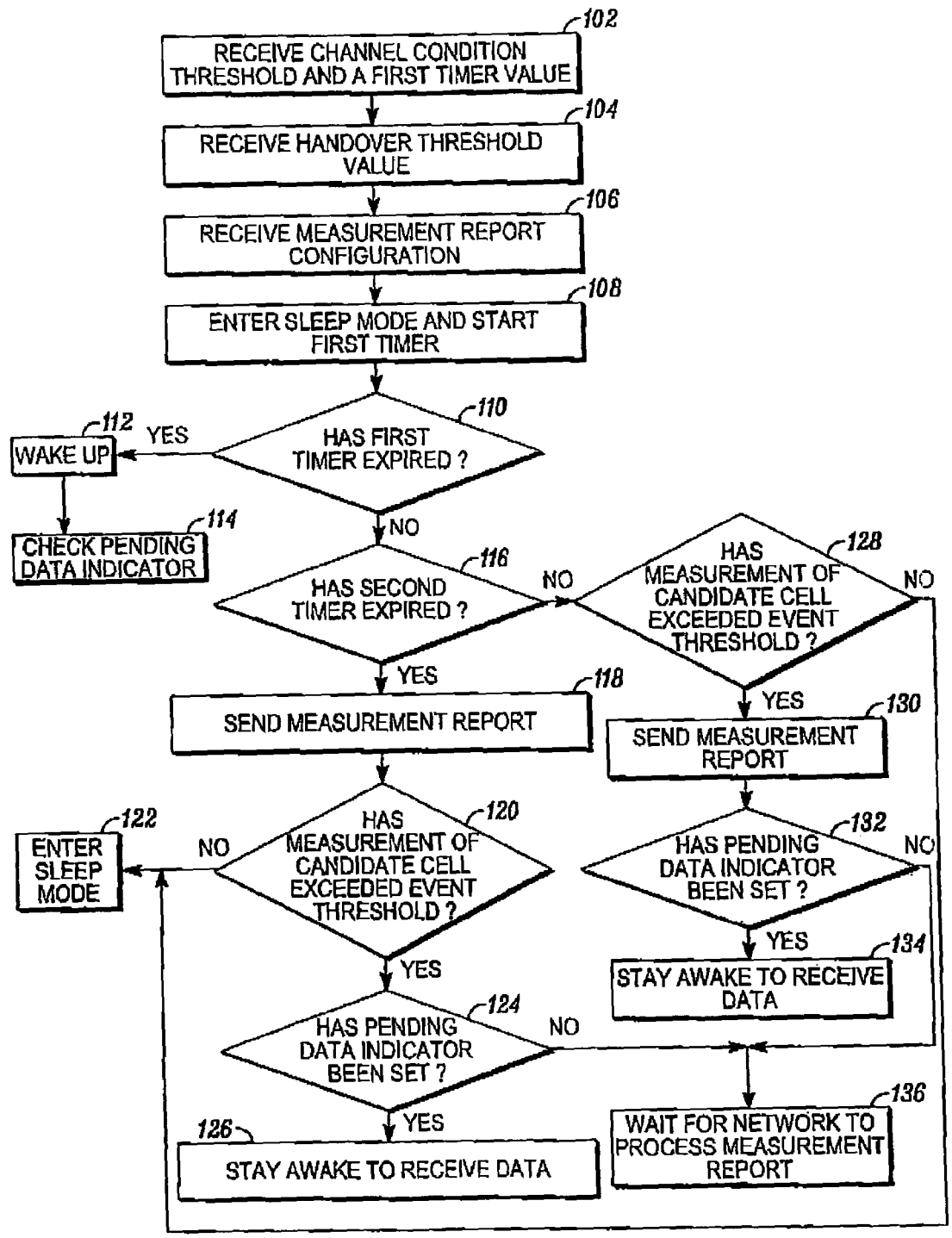
FIG. 1 is an illustrative process flow diagram for mobile operation in discontinuous reception mode with an impending handover.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

While the present invention is achievable by various forms of embodiment, there is shown in the drawings and described hereinafter several examples of embodiments with the understanding that the present disclosure is to be considered an exemplification of the invention and is not intended to limit the invention to the specific embodiments contained herein as will become more fully apparent from the discussion below. It is further understood that the method for sleep mode of the present invention may be used more generally in any application where it is desirable to provide signaling and current drain reduction.

It is to be understood that the mobile station (mobile) is a remote station coupled, wirelessly in this exemplary embodiment, to the network. It may also be referred to as a mobile, remote station, user equipment, user terminal or the like. In the embodiment described the mobile is wirelessly connected to the network though a plurality of base stations and network controllers. In this exemplary embodiment the mobile enters a sleep mode to conserve battery charge. It is understood that these are exemplary embodiments and that other criteria may be used for entering current drain reduction state.

On method for current drain reduction in wireless devices is discontinuous reception mode. Discontinuous reception mode has two states in general; a sleep state (also known as sleep mode, sleep cycle, reduced power state, inactive state of the like); and an active state, (also known as awake mode, and the like). Discontinuous reception may also be aperiodic discontinuous reception.

In this exemplary embodiment, the device is an electronic device such as a radiotelephone. The radiotelephone described herein is a representation of the type of wireless communication device that may benefit from the present invention. However, it is to be understood that the present invention may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the radiotelephone 100 should also be considered to apply equally to other portable wireless electronic devices.

Before describing in detail exemplary embodiments that are in accordance with the present invention, it should be observed that the embodiments reside primarily in combinations of method steps and apparatus components related to sleep mode and handover of an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention.

It is further understood that the use of relational terms, if any, such as first and second, such as a first timer and a second timer, and the like are used solely to distinguish one from another entity or action without necessarily requiring or implying any actual such relationship or order between such entities or actions.

Many, wireless communication systems in general comprise a Radio Access Network (RAN) and a core network (CN). The RAN includes base stations, also known in some systems as a cell site, access point, node or the like. The RAN also includes associated radio network controllers (RNC) providing wireless communication links with user devices (UD), also referred to herein as mobile stations (mobile), user equipment (UE) or the like. The core network receives messages from the public switched telephone network (PSTN), other mobile stations, the internet, other core networks, and other network entities. The wireless communication system is coupled to other wireless communications systems, but each respective system is typically operated by one operator or carrier. Such systems are currently used for landline, such as cable and twisted wire pair systems, and wireless systems such as Global System for Mobile communication (GSM), other time division multiple access (TDMA) systems, and code divisions multiple access (CDMA) networks for example. As a mobile changes location, to achieve the best wireless link connection, the mobile may change or handover from one base station to another depending on the relative position to each base station and the RF signal quality.

Disclosed is a method for a mobile station operating in discontinuous reception mode and the management of data during an impending handover. The method comprises receiving a handover threshold value from the network. The mobile enters sleep mode (or sleep cycle) and, while in sleep mode, monitors a channel condition associated with neighboring cells that are handover candidates. The mobile determines the relative value of the candidate cell channel condition to the received handover threshold value. Concurrently during the sleep cycle of the discontinuous reception mode, the mobile monitors the channel conditions associated with the current serving cell. When the mobile determines that a candidate cell has a channel condition above the received threshold, the mobile sends a measurement report to the network. The network determines that the mobile should be handed of to the candidate cell and as a result reschedules the transmission at an earlier time and sends the data received for the mobile to the mobile. The current serving cell sends the data to the mobile instead of sending the data to the neighboring cell. The mobile station remains awake to receive data.

FIG. 1 illustrates one exemplary process flow diagram for sleep mode with an impending handover. In this exemplary embodiment, the mobile receives 104, 106 from the network a handover threshold value, and a measurement report configuration. The mobile may also receive 102 a current serving cell channel condition threshold value, a first timer value, and a second timer value. The handover threshold value is a signal level threshold used by the network to determine when a neighboring cell (e.g., base station) that is a candidate for handover from the current serving cell, has sufficient channel characteristics, such as signal level or the like, to begin the handover process. The current serving cell channel condition threshold value is the threshold value associated with a channel condition between the mobile and the current serving cell.

The first timer is a sleep timer for setting the maximum sleep time interval of the mobile. The network (or current serving cell) knows when this timer will expire and therefore can schedule transmission to the mobile based on the expiration of the first timer. The first timer value is sent to the mobile from the network so that the network can adjust how long the mobile remains in sleep mode which depends on a plurality of conditions including how many mobiles the cell is currently serving, the amount of data to be sent to the plurality of mobiles and the like.

The second timer value is for indicating a minimum interval between measurement reports sent from the mobile to the network. In this exemplary embodiment, the minimum interval is a minimum time interval and based on time; however, in one alternate embodiment, it may be a minimum frame interval.

In FIG. 1, the device enters 108 sleep mode and substantially concurrently starts the first timer and the second timer. It is understood by those skilled in the art that the mobile may enter sleep mode as a result of a plurality of conditions. It is also understood that one timer (e.g. a clock residing in the processor) may be used in place of the first timer and the second timer and that events will be triggered based on the first timer value and the second timer value. For example, when the clock reaches a first time equal to the first timer value, the mobile will exit sleep mode and wait for information from the network.

While in sleep mode the mobile makes measurements, i.e. monitors, of channel conditions associated with at least one handover candidate cell and potentially a plurality of other handover candidate cells. For example, the device may make measurements of the pilot signal of a handover candidate cell. It is understood that there are a plurality of channel conditions that may be measured by the mobile. In this exemplary embodiment, the mobile measures an Es/No value of the reference signal transmitted by the handover candidate cell.

The mobile checks the first timer in the exemplary flow diagram of FIG. 1, to determine 110 if the first timer value has been exceeded (i.e. has expired). If the first timer has expired, then the mobile wakes up 112. In this embodiment, the network has determined what the value of the first timer value should be based on a set of predetermined conditions known to the network. Therefore, as discussed above, the network knows when the first timer will expire and when the mobile will wake up. As a result, the network may schedule and send information automatically, a pending data indicator in this exemplary embodiment, to the mobile without any inquiry from the mobile. The mobile checks 114 (i.e. waits to receive) for the pending data indicator sent from the network. If there is data to be sent (i.e. the pending data indicator is set, i.e. a bit is toggled and sent to the mobile) the mobile will receive the data as scheduled by the network.

If the first timer value has not been exceeded, the mobile determines 116 if the second timer value has been exceeded (i.e. the second timer has expired). If the second timer has expired the mobile may wake and send 118 a measurement report to the network. Whether or not the mobile station sends the measurement report is based on the measurement configuration received from the network. For example, the measurement configuration may indicate to the mobile to send the measurement report only when a timer expires or when a handover candidate cell has exceeded the handover threshold value.

The mobile will also determine 120 whether the measurement of the channel condition of the handover candidate cell has exceeded the handover threshold value. If the handover threshold value has been exceeded, the mobile determines 124 whether the pending data indicator has been set by the current serving cell. If the pending data indicator has been set, then in this embodiment, the mobile stays awake 126 to receive the data from the current serving cell. As discussed above, if the pending data indicator has not been set, the mobile waits 136 for the current serving cell to process the measurement report. If the handover threshold value has not been exceeded, the mobile re-enters 122 sleep mode.

If the mobile determines 116 that the second timer has not expired, the mobile will determine 128 whether the measurement of the channel condition of the handover candidate cell has exceeded the handover threshold value. The mobile will also determine if the current serving cell channel condition is greater than the channel condition threshold. If the handover threshold value has been exceeded, and in one embodiment, the current serving cell channel condition has not been exceeded, the mobile wakes or remains awake and sends 130 the measurement report to the network. Then the mobile determines 132 whether the pending data indicator has been set by the current serving cell. If the pending data indicator has been set, then the mobile waits to receive the data. In this embodiment, the mobile remains awake 134 to receive the data from the current serving cell.

As discussed above, if the pending data indicator has not been set, the mobile waits 136 for the current serving cell to process the measurement report and waits to receive instructions regarding the change of the radio connection, i.e. a handover message. If the handover threshold value has not been exceeded, the mobile re-enters 122 sleep mode.

Figure 2:
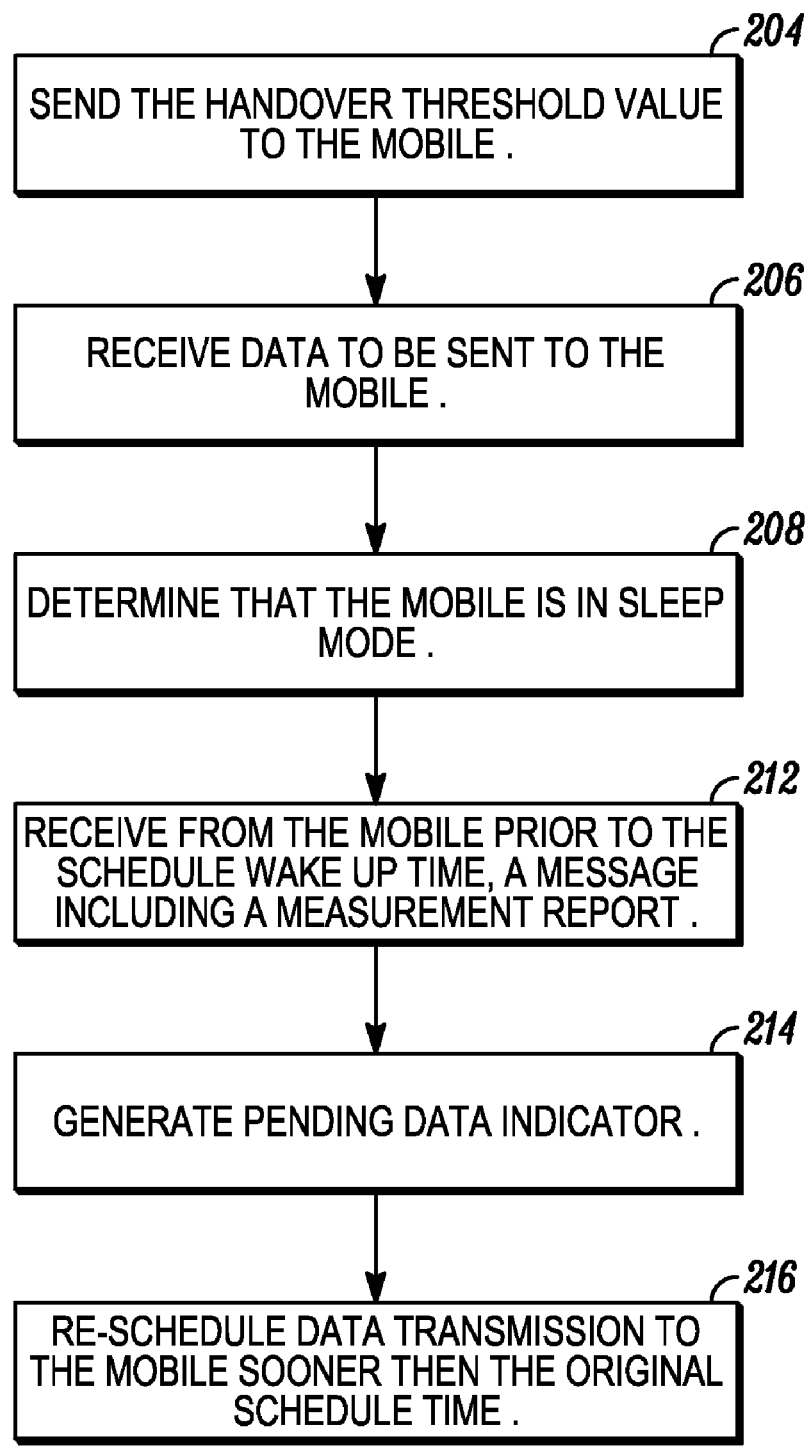
FIG. 2 is a second illustrative process flow diagram for a network with an impending handover for a mobile that is in discontinuous reception mode.

FIG. 2 shows an exemplary flow diagram illustrating the network operation with a mobile in discontinuous reception mode and with a potential impending handover. The network determines what the handover threshold value should be and sends the value to the mobile. The network sends 204 a set of measurement report configuration parameters to the mobile. The measurement report configuration parameters include a periodic timer, event thresholds, or the like, in this exemplary embodiment. Subsequently, the mobile enters sleep mode.

While the mobile is in sleep mode, the current serving cell receives 206 data that is to be sent to the mobile. The network determines 208 or knows based on the sleep timer information it sent to the mobile previously, e.g. the first timer value, that the mobile is in sleep mode and data can not be sent to the mobile until the mobile wakes. The current serving cell buffers the received data for the mobile while the mobile is in sleep mode and schedules the transmission of the buffered data for a time when the mobile is awake. This allows the network to optimize the scheduled transmissions to other mobiles in the mean time.

The current serving cell of the network generates 214 a pending data indicator to send to the mobile once the mobile has exited sleep mode. The current serving cell receives 212 from the mobile a message that includes the measurement report, indicating that the handover threshold value has been exceeded by a first neighboring cell and that the channel condition of the current serving cell is less than the channel condition threshold. The network determines that the mobile is to be handed over from the current serving cell to the neighboring cell. Then the current serving cell reschedules 216 the transmission of the data and sends the pending data to the mobile instead of transferring the data to the first neighboring cell. This allows the data to be sent to the mobile before the channel conditions may change. The data does not need to be routed to the neighboring candidate cell and then to the mobile once the handover has completed.

It is to be understood that a cell site is a part of the radio access network (RAN). In general, the RAN has a plurality of cell sites as part of the RAN. Each cell site may also be referred to as a base station, access point, node or the like. The scheduling of data transmission is handled at the bases station in this exemplary embodiment. The scheduling may also be handled at a mobile switching center (MSC) coupled to each of the cell sites. Data is routed from the internet to the MSC and then to the particular cell site that is the current cell saving the mobile station.

The network determines the handover threshold based on network configuration such as cell size and reference signal strengths. Alternatively, the network may also send handover threshold value limits to the mobile station. The handover threshold limits may include an upper threshold limit and a lower threshold limit such that a mobile can adjust the handover threshold value within the threshold limits.

It will be appreciated that embodiments of the invention described herein may be comprised of or performed by one or more conventional processors and unique stored program instructions that control the one or more processors to implement, in conjunction with certain non-processor circuits, some, most, or all of the functions of mobile sleep mode and handover processes described herein. The non-processor circuits may include, but are not limited to, a radio receiver, a radio transmitter, signal drivers, clock circuits, power source circuits, and user input devices. As such, these functions may be interpreted as steps of a method to perform handover and sleep mode operations. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method performed by a mobile wireless device to expedite acquisition of data from a serving cell prior to handover, the serving cell providing wireless communication service to the wireless device, the wireless device being capable of operating in a discontinuous reception mode, the method comprising:

receiving a measurement report configuration from the serving cell, the measurement report configuration including at least one measurement report configuration parameter based upon which the wireless device is to determine whether to send a measurement report;

monitoring at least one channel condition of at least one handover candidate cell while in a sleep cycle of the discontinuous reception mode;

determining whether a handover may be necessary based on the at least one channel condition of the at least one handover candidate cell;

awaking from the sleep cycle in accordance with the discontinuous reception mode; while awake from the sleep cycle,
  transmitting the measurement report to the serving cell in response to a determination that the measurement report is to be sent, the determination being based upon the at least one measurement report configuration parameter and the measurement report including the at least one channel condition of the at least one handover candidate, and
  receiving a pending data indicator from the serving cell after transmission of the measurement report, the pending data indicator indicating that the serving cell has data to send to the wireless device, wherein the data was received by the serving cell for the wireless device and was originally to be delivered to the wireless device after a time at which the wireless device would be handed off to a handover candidate cell; and
  responsive to receipt of the pending data indicator and determination that the handover may be necessary, remaining awake to receive the data from the serving cell prior to a handover of the wireless device to the handover candidate cell such that delivery of the data is expedited when compared to a time at which the data was originally to be delivered to the wireless device.

2. The method of claim 1, further comprising:
receiving a serving cell channel condition threshold value from the serving cell; and
monitoring a channel condition of the serving cell while in a sleep cycle of the discontinuous reception mode.

3. The method of claim 1, further comprising:
receiving a handover threshold value from the serving cell.

4. The method of claim 1, further comprising:
receiving, from a network, a handover threshold that includes an upper threshold limit and a lower threshold limit such that the wireless device can adjust the threshold within the threshold limits.

5. The method of claim 1, further comprising:
receiving a serving cell condition threshold value that is related to a received signal to noise ratio.

6. The method of claim 3, wherein transmitting the measurement report includes:
determining that the channel condition of the handover candidate cell has exceeded the handover threshold value.

7. The method of claim 2, further comprising:
determining that the serving cell channel condition threshold value has not been met.

8. The method of claim 1, further comprising:
receiving a timer value that indicates a maximum time the wireless device is to remain in the sleep cycle.

9. The method of claim 1, further comprising:
receiving a timer value that indicates a minimum interval between sending measurement reports to the serving cell.

10. A method in a wireless communication device, the method comprising:
  entering a sleep cycle of a discontinuous reception mode while receiving wireless communication service from a serving cell;
  while in the sleep cycle, determining channel conditions for a plurality of handover candidates;
  awaking from the sleep cycle in accordance with the discontinuous reception mode;
  while awake from the sleep cycle, determining whether the serving cell has data to send to the wireless communication device, wherein the data was received by the serving cell for the wireless communication device and was originally to be delivered to the wireless communication device after a time at which the wireless communication device would be handed off to one of the plurality of handover candidates;
  responsive to determining that the serving cell has data to send to the wireless communication device, remaining awake from the sleep cycle if at least a channel condition of a handover candidate is greater than a handover threshold value; and
  while remaining awake from the sleep cycle, receiving the data from the serving cell prior to a handover to the handover candidate such that delivery of the data is expedited when compared to a time at which the data was originally to be delivered to the wireless communication device.

11. The method of claim 10, further comprising:
prior to entering the sleep cycle, receiving, from the serving cell, a channel condition threshold for the serving cell; and
determining whether a channel condition of the serving cell is below the channel condition threshold;
wherein the wireless communication device remains awake from the sleep cycle if a channel condition of a handover candidate is greater than the handover threshold, the channel condition of the serving cell is below the channel condition threshold, and the serving cell has data to send to the wireless communication device such that delivery of the data is expedited when compared to the time at which the data was originally to be delivered to the wireless communication device.

12. A method in a current serving cell of a communication network that is providing wireless communication service to a mobile station, the method comprising:
  receiving data that is to be sent to the mobile station and storing the data in a buffer;
  receiving a message from the mobile station that includes a channel condition measurement report for a neighboring cell and the current serving cell, the channel condition measurement report indicating that a channel condition of the current serving cell is below a channel condition threshold and a channel condition of the neighboring cell exceeds a handover threshold;
  determining, based on the channel condition measurement report, that a handover of the mobile station to the neighboring cell is to occur;
  determining that the data is scheduled to be transmitted to the mobile station after the handoff is to occur; and
  re-scheduling transmission of the data to the mobile station such that transmission of the data occurs prior to the handoff.

13. The method of claim 12, further comprising:
determining that the mobile station is in sleep mode and scheduling the data for transmission to the mobile station after the mobile station has exited sleep mode.

14. The method of claim 13, further comprising:
sending a pending data indicator to the mobile station after the mobile station has exited the sleep mode and before the handoff to the neighboring cell to inform the mobile station that the current serving cell has the data to send to the mobile station before the handoff.

15. The method of claim 12, further comprising:
re-scheduling transmission of the data to the mobile station at a time after a first timer has expired, the first timer corresponding to a time period in which the mobile station is in a sleep mode.

16. A method in a wireless communication device, the method comprising:

checking channel conditions of a serving cell and a plurality of handover candidates while the wireless communication device is in a sleep cycle of a discontinuous reception mode and receiving communication service from the serving cell;

transmitting a measurement report to the serving cell when the channel conditions of the serving cell and the plurality of handover candidates indicate a need to execute a handover of the communication service to at least one of the plurality of handover candidates, the measurement report indicating the need to execute the handover;

receiving, after the wireless communication device has awoken from the sleep cycle and entered an active state, a pending downlink transmission status from the serving cell in response to transmission of the measurement report, the pending downlink transmission status indicating that the serving cell has data to send to the wireless communication device, wherein the data was received by the serving cell for the wireless communication device and was originally to be delivered to the wireless communication device after a time at which the wireless communication device would be handed off to the at least one of the plurality of handover candidates; and responsive to receiving the pending downlink transmission status, remaining in the active state, instead of returning to the sleep cycle, to allow the serving cell to send the data to the wireless communication device prior to the handover such that delivery of the data is expedited when compared to a time at which the data was originally to be delivered to the wireless communication device.

17. A method for pre-handover data transfer from a serving cell to a mobile station, the serving cell providing wireless communication service to the mobile station, the method comprising:

receiving, by the mobile station from the serving cell, a channel condition threshold, a handover threshold, and a timer value;

entering, by the mobile station, a sleep cycle of a discontinuous reception mode after receiving the channel condition threshold, the handover threshold, and the timer value, wherein the timer value defines a duration of the sleep cycle;

while in the sleep cycle, determining, by the mobile station, channel conditions for the serving cell and at least one handover candidate cell;

awaking, by the mobile station, upon expiration of the sleep cycle;

while awake from the sleep cycle, determining, by the mobile station, whether the serving cell has data to send to the mobile station, wherein the data was received by the serving cell for the mobile station and was to be delivered to the mobile station after a time at which the mobile station would be handed off to the at least one handover candidate cell;

remaining awake, by the mobile station, from the sleep cycle if the channel conditions for the serving cell and the at least one handover candidate cell, when respectively compared to the channel condition threshold and the handover threshold, indicate that a handover of the mobile station to a handover candidate cell is necessary and the serving cell has data to send to the mobile station; and while remaining awake from the sleep cycle, receiving, by the mobile station, the data from the serving cell prior to the handover to the handover candidate cell such that delivery of the data is expedited when compared to a time at which the data was originally to be delivered to the mobile station.

18. The method of claim 17, further comprising:

transmitting, by the mobile station, a measurement report including the channel conditions for the serving cell and the at least one handover candidate cell;

receiving, by the serving cell, the measurement report;

determining, by the serving cell, whether the mobile station is to be handed over to the at least one handover candidate cell based on the measurement report;

transmitting, by the serving cell, a pending data indicator to the mobile station when the measurement report indicates that the mobile station is to be handed over to the at least one handover candidate cell and the serving cell has data to send to the mobile station, the transmission of the pending data indicator occurring during a period of time when the mobile station is awake from the sleep cycle; and determining, by the serving cell, that the data is scheduled to be transmitted to the mobile station after the handover is to occur;

re-scheduling, by the serving cell, transmission of the data to the mobile station such that transmission of the data occurs prior to the handover;

wherein the mobile station determines that the serving cell has data to send based upon receipt of the pending data indicator.

* * * * *